June 19, 1928. 1,673,795
M. A. BECK
POWER TRANSMISSION MECHANISM
Filed Feb. 20, 1926 2 Sheets-Sheet 1
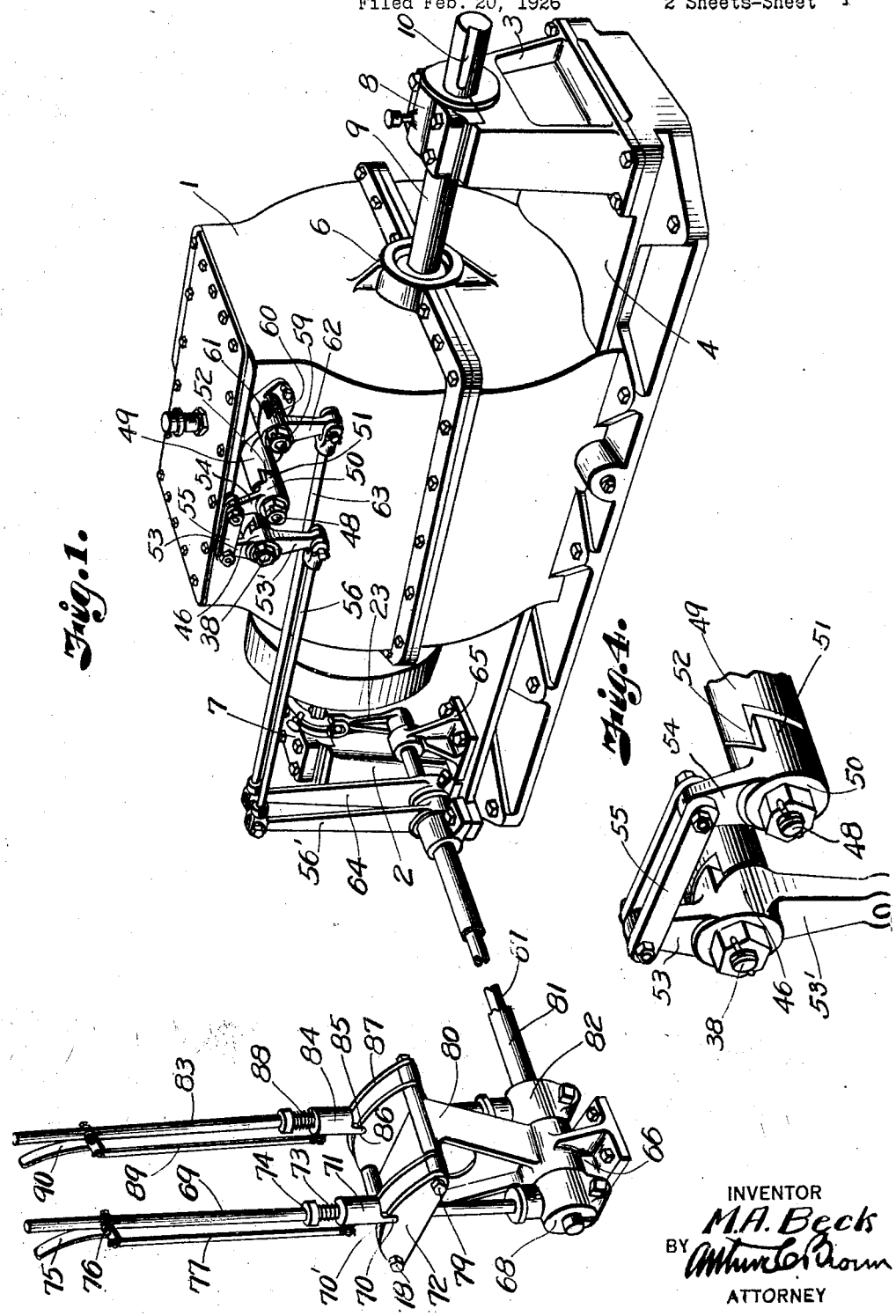
INVENTOR
M.A. Beck
BY
ATTORNEY June 19, 1928.  
M. A. BECK  
POWER TRANSMISSION MECHANISM  
Filed Feb. 20, 1926  
1,673,795  
2 Sheets-Sheet 2
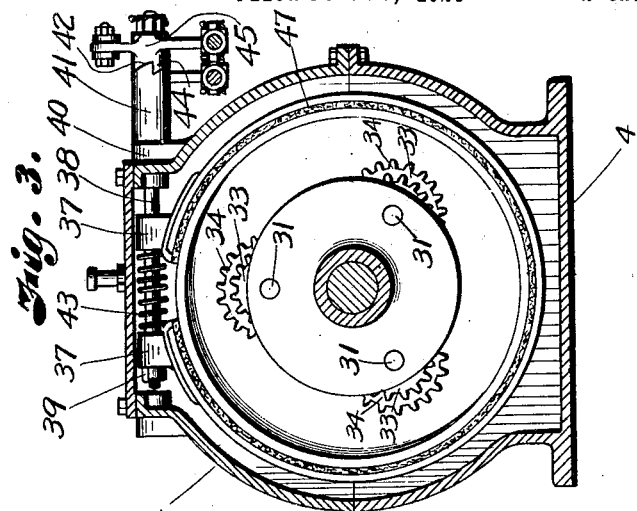
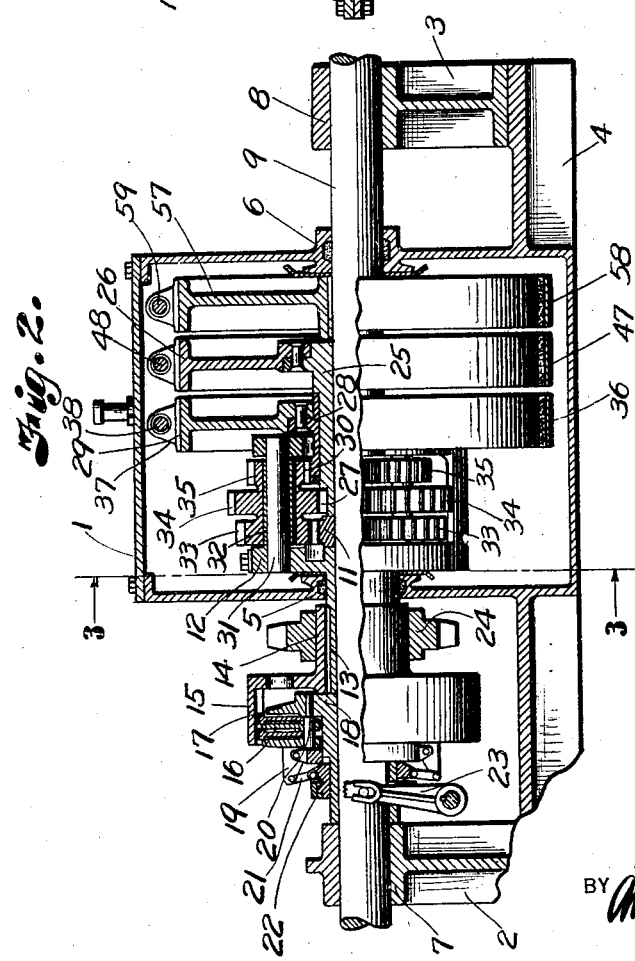
INVENTOR  
M.A. Beck  
BY  
ATTORNEY Patented June 19, 1928.

1,673,795

UNITED STATES PATENT OFFICE.

MATTHIAS A. BECK, OF MILWAUKEE, WISCONSIN, ASSIGNOR TO RICHARD C. MASON, C. F. FARREN, AND T. J. WOOD, ALL OF TULSA, OKLAHOMA.

POWER-TRANSMISSION MECHANISM.

Application filed February 20, 1926. Serial No. 89,632.

My invention relates to power transmitting mechanism and more particularly to means for controlling a transmission of the planetary type, the principal object of the invention being to simplify control of the transmission and adapt it for use under conditions where control at a distance from the transmission is either necessary or desirable.

In accomplishing this object I have provided improved details of structure, the preferred forms of which are illustrated in the accompanying drawings wherein:—

Fig. 1 is a perspective view of an ordinary type of planetary gear transmission equipped with control mechanism embodying my invention.

Fig. 2 is a side view of the transmission, partly in elevation and partly in central vertical section.

Fig. 3 is a transverse section on the line 3—3, Fig. 2.

Fig. 4 is a detail perspective view of the low and reverse gear clutch operating mechanism.

Referring more in detail to the drawings, 1 designates a housing for the planetary gear mechanism, and 2—3, standards at opposite ends of the housing 1, the housing and standards being mounted on a common base 4 to provide a substantial structure and insure alignment of the bearings 5 and 6 of the gear housing with the bearings 7 and 8 of the respective standards. Extending entirely through the housing and journalled in the standard bearings 7—8 as well as in the housing bearings 5—6 is a shaft 9 with which an element to be operated by the transmission may be connected in any suitable manner, the point of connection being indicated by the spline groove 10 in the shaft.

Fixed to the shaft 9 within the housing 1 is a pinion 11. Loosely mounted on the shaft, within the housing, is a gear carrier 12, having a sleeve 13 extending through the bearing 5 to the exterior of the housing.

Splined to the sleeve 13 exterior of the housing, is the hub 14 of a loose clutch member 15 comprising disks 16 co-operative with disks 17 on a sleeve 18 keyed to the shaft 9, the disks 16 being normally free to rotate relative to the disks 17, but adapted for frictional locking contact therewith when the loose clutch member is shifted by an arm 19 on a rod 20 which extends to the outside of the clutch body and is there connected with a lever 21 on a collar 22 slidably mounted on the sleeve 18 and operatively connected with a lever 23 whereby the clutch is set or released to connect or disconnect the shaft 9 with the constantly rotating housing member 15. This clutch is provided for effecting direct driving connection between the shaft 9 and the prime mover as is customary in the use of transmissions of this character. The loose clutch member 15 is connected with the prime mover in any suitable manner but preferably through a belt (not shown) operable by the prime mover and runing over a sprocket wheel 24 that is fixed to the hub 14 of the loose clutch member. With this arrangement the gear carrier 12 rotates constantly with the free clutch member 15 but does not operate the shaft except under the conditions hereinafter stated, and the shaft is only connected with the direct drive member when the clutch is operated to produce that effect by shifting of the lever 23.

Loosely mounted on the shaft 9, within the housing 1 and at the side of the pinion 11 opposite the gear carrier, is a sleeve 25 upon which a band wheel 26 is rigidly mounted and on which is rigidly fixed a small pinion 27. Loosely mounted on the sleeve 25 is an outer sleeve 28 on which is rigidly mounted a band wheel 29 and to which is rigidly fixed a pinion 30 of greater diameter than the pinion 27 on the sleeve 25 or the gear 11 on the shaft 9.

Fixed to the gear carrier 12 and extending parallel with the shaft 9, over the gear wheels 11, 27 and 30, is a stub shaft 31 rotatably mounting a sleeve 32 to which are fixed the integral gear wheels 33, 34 and 35, the gear wheel 33 meshing with the gear wheel 11 on the shaft 9, the gear wheel 34 meshing with the pinion 27 on the collar 25 and the gear wheel 35 meshing with the pinion 30 on the sleeve 28. Surrounding the rim of the band wheel 29 is a brake band 36 having apertured lugs 37 at its free end through which a rod 38 is projected, one end of the rod carrying a nut 39 in engagement with the outer face of the adjacent lug and the opposite end of the rod extending through a guide 40 on the side of the housing 1 and through a sleeve 41 that is rigidly mounted on the housing and provided with a clutch face 42 at its free end. Surrounding the rod between the lugs 37 is an expansion spring 43 normally tending to spread the clutch band to hold it free from the rim of the wheel 29 and to retain the jaw 44 of a clutch collar 45, that is rigidly fixed on the rod, in inset relation with the clutch face 42 on the collar 41.

The band wheel 26 is provided with a clutch band 47 and the band 47 with a rod 48 corresponding to the band 36 and rod 38 of the wheel 29, the rod 48 extending through a sleeve 49 on the housing 1 and having a fixed collar 50 at its free end provided with a jaw 51 for engaging the cam face 52 of the sleeve 49, all as in the case of the parts relating to the band wheel 29, except that the cam face 52 and jaw 51 of the rod 48 are reversed relative to corresponding parts of the rod 38, the cam face and jaw for the rod 48 tending to move the rod outwardly and tighten the band 47 on the wheel 26 when the rod 48 is moved clockwise, and the same effect being produced on the rod 38 when the rod is moved anti-clockwise (Fig. 1).

In order to simplify the mechanism, I provide for operating both of the rods 38 and 48 from the same main lever and for this purpose provide the collars 46 and 50 on said rods with fingers 53 and 54 and connect the fingers by a link 55, so that when the control is operated to shift the jaw of one collar on the cam face of its mating stationary member, and thereby extend the rod to close the clutch band on its corresponding wheel, the reverse operation will be performed on the other rod set to insure against the clutch band of that set contacting its band wheel.

In order that the cam jaw 51 on the rod 48 may move anti-clockwise from the neutral position I set the collar 50 so that the jaw 51 is slightly in advance of its corresponding member on the cam face 52 at the end of the sleeve 49 under normal conditions, and may move idly relative to the cam face when the collar 46 is moving anti-clockwise to set the clutch on the band wheel 29, this back movement of the collar 50 only tending to insure opening movement of the clutch band 47 on the wheel 26. The collar 46 on the rod 38 is provided opposite the finger 53 with a finger 53' connected by a link 56 with a crank arm 56' whereby the two clutch rods may be operated simultaneously in the manner presently described.

Fixed on the shaft 9 within the housing 1 and adjacent the band wheel 26 is a third band wheel 57, surrounded by a clutch band 58 having a control rod 59 associated and equipped as are the rods 38 and 48 heretofore described in connection with the other two band wheels, the rod 59 extending to the outside of the housing where it is provided with a clutch jaw 60 co-operating with a clutch face 61 and provided with a finger 62 connected by a link 63 with a crank arm 64, the wheels 57 and band 58 constituting a brake for the shaft 9.

Journalled in a bearing 65 on the base 4 and in a bearing 66 at a suitable distance from the base is a shaft 67. Fixed to one end of the shaft 67 is the direct clutch crank arm 23 and the brake clutch crank arm 64, and attached to the opposite end of said shaft, by a clamp collar 68, is an operating lever 69, normally held in neutral position by a pawl 70 on a sleeve 71 slidably mounted on the lever 69 and yieldingly projected to seat the pawl 70 in a notch 70' in a quadrant 72 by an expansion spring 73 located on the lever 69 and engaging the top of the collar 71 and the bottom of a collar 74 rigidly fixed on the lever. The pawl is movable against tension of the spring 73 to release the lever by a handle 75 pivotally mounted at 76 to the lever 69 and connected with the pawl sleeve 71 by a link 77.

The quadrant 72 comprises a pair of arcuate plates mounted on the ends of rods 78 and 79 carried by a bracket 80 integral with and rising from the bearing member 66.

Rotatable on the combined clutch and brake rod 67 is a tubular shaft 81, on one end of which is mounted the clutch operating crank arm 56 and on the other end of which is rigidly fixed a collar 82 carrying an operating lever 83 provided with a pawl collar having a pawl 85 urged to normal locking engagement in a notch 86 in a quadrant 87 mounted on the ends of the rods 78 and 79 opposite the quadrant 72, the collar 84 being urged to normal position by an expansion spring 88 and having connection through a link 89, with a handle 90 pivoted to the lever 83, the lever 83 and its co-operating parts being in duplicate of the lever 69 and its co-operating parts, and operable independently thereof.

Assuming the parts to be constructed and assembled as described, the operation of the transmission and its control is as follows:

Normally the parts are in the neutral position illustrated in Fig. 1, and the loose member of the main clutch constantly rotated about the shaft by the prime mover indicated by the sprocket wheel 24. If it is desired to drive the transmission shaft forwardly at low speed, the operating lever 83 is shifted anti-clockwise (Fig. 1), thereby rocking the tubular shaft 81 anti-clockwise, drawing the link rod 55 to the left and rocking the collars 46 and 50 clockwise, movement of the collar 46 being effected through its direct connection with the rod 56 and of the collar 50 by its connection through the link 55 with the collar 46. When this shifting movement takes place the collar 46 merely moves idly on its rod 38, but the collar 50 is moved outwardly along the cam face 52 of the sleeve 49, drawing the rod 48 with it against tension of the spring corresponding with spring 43 on rod 38, tightening the clutch band 47 on the rim of the wheel 26, locking the wheel so that the large gear wheels 33 of the planetary sets are operated by the pinion 27 on the sleeve 25 of wheel 26 and operating through the smaller gear wheel 32 on the pinion 11 fixed to the shaft 9, rotating the shaft 9 forwardly and at low speed, the reverse gear band wheel being positively held open during this low speed operation.

To reverse the travel of the transmission shaft 9 the lever 83 is moved clockwise from neutral position, shifting the crank arm 56' clockwise, the rod 56 to the right, and the collars 46 and 50 anti-clockwise, thereby moving the cam jaw on the collar 46 on the cam face of the sleeve 41, tightening the clutch on the band wheel 29 and locking the band wheel and its pinion 30. The gear wheels 33 of the planetating sets then turn on the stationary pinion of the reverse gear band wheel, rotating the relatively larger gear wheel 33 and thereby tending to reversely operate the transmission shaft in the ordinary manner.

To drive the transmission shaft at high speed the transmission shaft is directly connected with the prime mover through the disk clutch mechanism by means of the crank arm 23, the crank arm for this operation being rocked anti-clockwise by corresponding movement of the operating lever 69. The crank arm 64 being also fixed on the rod 67, draws the link 63 to the left (Fig. 1) rocking the collar 60 on the rod 59 controlling the brake band clutch anti-clockwise to insure against the brake clutch 58 tightening on the brake band wheel 57.
When the brake is to be applied the operating lever 69 is moved clockwise, shifting the crank arm 23 in the same direction and rocking the collar 60 anti-clockwise, this movement of the collar 60 carrying the clutch jaw on the inner ends of the collar over the clutch face on the collar 61 to move the rod 59 outwardly and tighten the band 58 on the wheel 57, thereby braking the transmission shaft.
It is apparent that with this control mechanism I eliminate one of the ordinary levers, as each of my levers 69 and 81 performs a double function, and that by my arrangement of control levers and crank arms, a transmission may be controlled and operated at a distance from the transmission mechanism, thereby making it possible to employ a transmission of this kind under conditions and for purposes for which the ordinary planetary transmission would not be adaptable.

What I claim and desire to secure by Letters Patent is:—

1. In combination with planetary gear transmission comprising a transmission shaft, reverse and low speed band wheels independently rotatable about the shaft, a clutch band for each wheel, an operating rod for each clutch band; and a shifting member for each rod, shifting means including sleeves having cam faces receiving the rods, an operating lever pivotally connected with the shifting members for both the reverse and low speed clutch rods for rocking the members selectively engaging the rods with said sleeves for shifting the rods according to the rocking movement of the lever.

2. In combination with planetary gear transmission mechanism comprising a transmission shaft, reverse and low speed band wheels independently rotatable about the shaft, a clutch band for each wheel, an operating rod for each clutch band, and a shifting member for each rod comprising a cam collar and its crank finger, connection between said crank fingers, a second crank finger on one of the collars, and an operating lever connected with said second crank finger, the cam collars being reversely arranged whereby selective operation of the clutch bands is effected by forward or back movement of the operating lever.

3. In combination with planetary gear transmission mechanism comprising a transmission shaft, reverse and low speed band wheels independently rotatable about the shaft, a clutch band for each wheel, an operating rod for each clutch band, and a shifting member for each rod, the shifting members being reversely arranged relative to their rods, an elongated, rotatable control shaft, an operating lever on one end of the shaft, and a crank arm on the other end of the shaft, connected with both of the shifting members, for effecting selective operation of the clutch bands according to direction of movement of the operating lever.

4. In combination with planetary gear transmission mechanism comprising a transmission shaft, a driving clutch member rotatable on the shaft, a driven clutch member fixed to the shaft, intermediate clutch mechanism for connecting said members, a brake wheel fixed on the shaft, a clutch band for said brake wheel, an operating rod for the clutch band, a shifting member for the rod, an operating lever, and means separately connecting the lever with the intermediate clutch mechanism and shifting member whereby the intermediate clutch mechanism is set and the brake clutch released upon movement of the operating lever in one direction and the brake clutch set and the intermediate clutch mechanism released upon movement of the operating lever in the other direction.

5. In combination with planetary gear transmission mechanism comprising a transmission shaft, a driving clutch member rotatable on the shaft, a driven clutch member fixed to the shaft, intermediate clutch mechanism for connecting said members, a brake wheel fixed on the shaft, a clutch band for said brake wheel, and operating rod for the clutch band, a shifting member for the rod, an elongated shaft, a crank arm on said shaft operatively connected with said intermediate clutch mechanism to lock the clutch when the elongated shaft is rotated in one direction, a crank arm on the shaft operatively connected with said shifting member to lock the brake clutch when the shaft is rotated in the opposite direction, and a single operating lever on the shaft for rotating the shaft in either direction.

6. In combination with planetary gear transmission, comprising a transmission shaft, a driving clutch member rotatable on the shaft, a driven clutch member fixed on the shaft, intermediate clutch mechanism for connecting said members, a brake band wheel fixed on the shaft, reverse and low gear band wheels independently rotatable about the shaft, a clutch band for each wheel, an operating rod for each clutch band, a shifting member for each rod, the shifting member for the reverse and low gear clutch rods being reversely arranged, an elongated, rotatable shaft, a crank arm on the elongated shaft operatively connected with said intermediate clutch mechanism to lock the driving clutch when said elongated shaft is rotated in one direction, a second crank arm on the shaft operatively connected with the shifting member for the brake clutch rod to lock the brake clutch when the elongated shaft is rotated in the other direction, a single operating lever on the elongated shaft for rotating said shaft in either direction, a tubular shaft rotatable on the elongated shaft, a crank arm on said tubular shaft connected with the shifting members on the reverse and low speed clutch rods, whereby the reverse clutch band is operated upon movement of said tubular shaft in one direction and the low speed clutch band is operated upon movement of said shaft in the opposite direction, and an operating lever on the tubular shaft for rotating said shaft in either direction.

In testimony whereof I affix my signature.

MATTHIAS A. BECK.